United States Patent
Archer et al.

(10) Patent No.: US 9,719,698 B2
(45) Date of Patent: Aug. 1, 2017

(54) SUBSEA COOLING APPARATUS, AND A SEPARATELY RETRIEVABLE SUBMERSIBLE PUMP MODULE FOR A SUBMERGED HEAT EXCHANGER

(75) Inventors: Eirik Archer, Oslo (NO); Marius Bjørn, Oslo (NO)

(73) Assignee: KONGSBERG OIL & GAS TECHNOLOGIES AS, Asker (NO)

( * ) Notice: Subject to any disclaimer, the term of this patent is extended or adjusted under 35 U.S.C. 154(b) by 814 days.

(21) Appl. No.: 14/009,923

(22) PCT Filed: Apr. 13, 2012

(86) PCT No.: PCT/NO2012/050066
§ 371 (c)(1),
(2), (4) Date: Feb. 14, 2014

(87) PCT Pub. No.: WO2012/141599
PCT Pub. Date: Oct. 18, 2012

(65) Prior Publication Data
US 2014/0158320 A1    Jun. 12, 2014

(30) Foreign Application Priority Data
Apr. 15, 2011 (NO) .................................. 20110596

(51) Int. Cl.
*F04D 13/08* (2006.01)
*F24J 3/08* (2006.01)
(Continued)

(52) U.S. Cl.
CPC ............. *F24J 3/085* (2013.01); *E21B 36/001* (2013.01); *F04D 13/08* (2013.01); *F28D 1/022* (2013.01);
(Continued)

(58) Field of Classification Search
CPC ............. F28F 2250/08; F28F 2009/226; F28F 2009/222; F28D 7/06; F28D 1/022;
(Continued)

(56) References Cited

U.S. PATENT DOCUMENTS 3,802,804 A * 4/1974 Zimmermann ........... F04D 7/06
417/360
4,228,845 A * 10/1980 Cowling .................. F25J 5/002
165/110

(Continued)

FOREIGN PATENT DOCUMENTS

| NO | 330105 B1 | 2/2011 |
| WO | 2008/147219 A2 | 12/2008 |
| WO | 2010/110676 A2 | 9/2010 |

OTHER PUBLICATIONS

International Search Report issued Jul. 10, 2012 in corresponding International Application No. PCT/NO2012/050066.
(Continued)

*Primary Examiner* — Peter J Bertheaud
*Assistant Examiner* — Dnyanesh Kasture
(74) *Attorney, Agent, or Firm* — Wenderoth, Lind & Ponack, L.L.P.

(57) ABSTRACT

The present invention concerns a cooling apparatus for subsea applications with a shell and tube heat exchanger. The heat exchanger includes a longitudinal shell. The shell forms a cavity with a fluid inlet port and fluid outlet port. A bundle of tubes extends from an inlet plenum chamber with an inlet port and into the shell on the same side of the shell as a bundle of tubes extending from an outlet plenum chamber with an outlet port. At least one tube sheet seals against the shell cavity and the inlet and outlet plenum chambers. The bundle of tubes extending from the inlet plenum chamber is in fluid connection with the bundle of tubes extending from the outlet plenum chamber. A retriev-
(Continued)

able pump module with a sealed pump module housing is placed adjacent the heat exchanger and includes a motor driving an ambient sea water pump.

14 Claims, 8 Drawing Sheets

(51) Int. Cl.
- *F28D 7/06* (2006.01)
- *F28D 1/02* (2006.01)
- *E21B 36/00* (2006.01)
- F28D 21/00 (2006.01)
- F28F 9/22 (2006.01)

(52) U.S. Cl.
CPC ........ *F28D 7/06* (2013.01); *F28D 2021/0059* (2013.01); *F28F 2009/226* (2013.01); *F28F 2250/08* (2013.01); *Y02E 10/14* (2013.01)

(58) Field of Classification Search
CPC .. F28D 2021/0059; F28D 7/16; F28D 7/1607; F24J 3/085; E21B 36/001; F04D 13/08; Y02E 10/14
See application file for complete search history.

(56) References Cited

U.S. PATENT DOCUMENTS

| | | | | |
|---|---|---|---|---|
| 6,119,780 A | * | 9/2000 | Christmas | E21B 43/128 166/105 |
| 6,201,365 B1 | * | 3/2001 | Hara | B60K 6/26 310/54 |
| 6,620,969 B1 | * | 9/2003 | Nishimura | B01D 3/322 165/133 |
| 8,740,583 B2 | * | 6/2014 | Pollack | B63B 35/44 417/360 |
| 2007/0235195 A1 | | 10/2007 | Lawson | |
| 2008/0213087 A1 | * | 9/2008 | Wagner | F04D 29/0413 415/182.1 |
| 2008/0302511 A1 | * | 12/2008 | Kragt | F28D 7/16 165/95 |
| 2009/0062020 A1 | * | 3/2009 | Edwards | F04D 13/021 464/89 |
| 2010/0282448 A1 | * | 11/2010 | Singh | F22B 1/167 165/135 |
| 2011/0100589 A1 | * | 5/2011 | Van Der Rest | F28D 1/022 165/45 |
| 2011/0247786 A1 | * | 10/2011 | Dixon | F28D 7/16 165/96 |

OTHER PUBLICATIONS

Norwegian Search Report issued Sep. 29, 2011 in corresponding Norwegian Application No. 20110596.

* cited by examiner

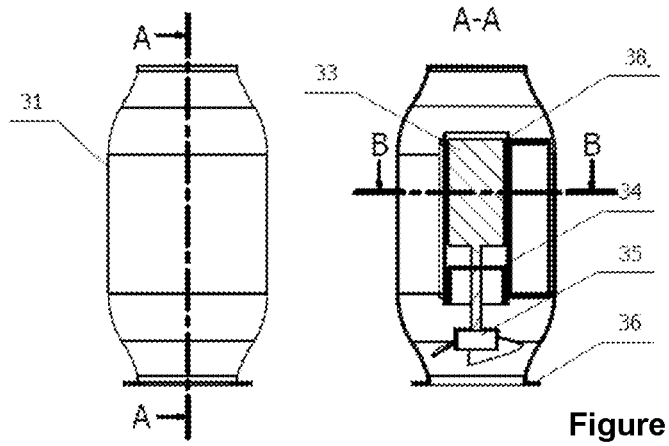
Figure 3a
Figure 3b
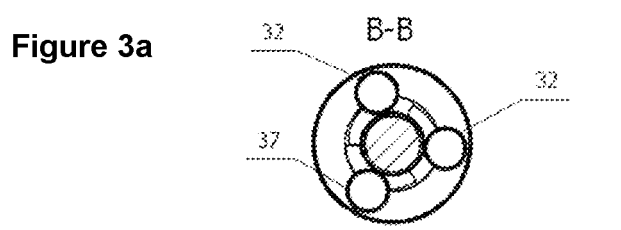
Figure 3c
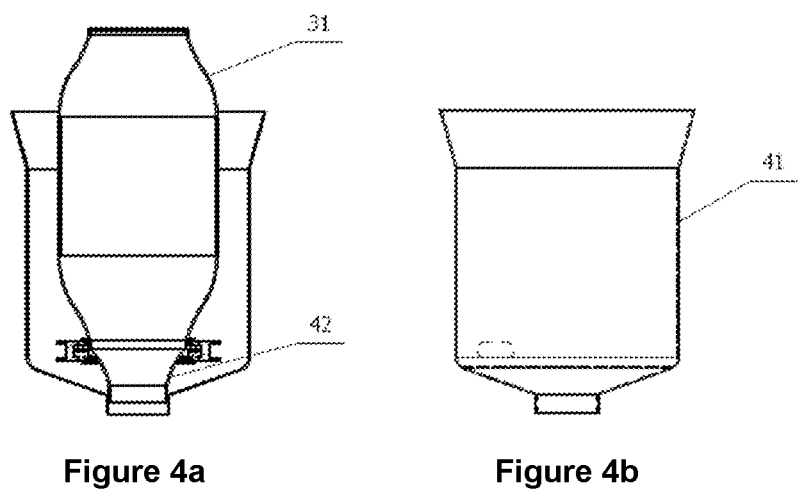
Figure 4a
Figure 4b

SUBSEA COOLING APPARATUS, AND A SEPARATELY RETRIEVABLE SUBMERSIBLE PUMP MODULE FOR A SUBMERGED HEAT EXCHANGER

BACKGROUND OF THE INVENTION

Technical Field

The present invention concerns a cooling apparatus for subsea applications including a shell and tube heat exchanger.

Offshore platform/topside based processes use coolers extensively. Typically these are based on using seawater as a coolant, often using a "shell and tube" cooler. Such a cooler comprises basically an outer shell, a large diameter pipe that acts as a conduit for the seawater, and closely spaced small diameter tubes that carry the produced fluid through the coolant. The seawater for the cooling is normally drawn from the platform seawater system and hence, no dedicated pumps are necessary. The technology related to shell and tube heat exchangers and the associated pumping arrangement is well established, and has few uncertainties.

Subsea oil and gas development may require cooling to reduce the operational temperature of the produced fluid. Typically, oil and gas pipelines have a design temperature that not should be exceeded. The tie-in of a high temperature development to such a pipeline will require cooling. For a new pipeline/flowline, introduction of cooling to keep the design temperature low, may give operational and cost benefits.

Presently subsea cooling is thus used for flowline/pipeline purposes and coolers for this purpose are based on natural convection to seawater. They are termed passive coolers and comprise a series of tubes, (typically from 1"-6" OD or 2.54 cm-15.24 cm) exposed to seawater that is allowed to circulate freely.

With the development of subsea gas compression, additional typical subsea cooling requirements have been defined. These requirements include compressor inlet cooling to increase efficiency, where produced fluid is cooled before entering the compressor. Typically subsea produced fluid will leave a wellhead with a temperature of 60° C. to 120° C. Some cooling will take place in the flowlines between the wells and the compression station, but dedicated inlet coolers may be required. Furthermore outlet cooling may be required as the compression process heats the produced fluid and the fluid may have to be cooled prior to entering the flowline/pipeline. Furthermore inter stage cooling may be used in connection with a multi stage compressor to increase the compressor efficiency. The cooling is then introduced between compressor stages. Finally, a compressor anti-surge loop will normally require cooling. Other subsea cooling applications are also conceivable.

Passive coolers as mentioned have been developed for such cooling. While passive convection coolers are simple, they have their limitations. They are large, heavy and their cooling efficiency is difficult to determine by analytical tools. The efficiency of a passive cooler is also sensitive to variations in external and non-controllable parameters as e.g. seabed current and settlement of silt. Furthermore, should the surface temperature of the cooling tubes be high, scaling may form on the tubes. A build-up of scale will reduce the efficiency of the cooler and such scale may be difficult and expensive to remove. A passive cooler also lacks the possibility to control the cooling and its outlet temperature. Typically it might be desirable to keep the outlet temperature above 25° C. to prevent formation of hydrate plugs.

In a topside process plant, seawater pumping and distribution will normally be centralized by use of a piping and valve arrangement. For a subsea application, this may according to the present invention be simplified and based on an inlet strainer per heat exchanger (coarse filtration only), and one pump module per heat exchanger.

It is conceivable to modify a typical passive cooler by arranging a duct around the tubes and add a propeller to increase the circulation. Such an arrangement will alleviate some of the disadvantages of the passive cooler, but do represent an unproven design without the full benefits of using a conventional shell and tube design subsea as outlined below.

Background Art

Such a solution has been suggested in patent application WO 2008/147219 A2. This application relates to a subsea cooling unit for a hot fluid stream from one or more subsea wells, with coils exposed to seawater and a propeller for generating a flow of seawater past the coils. The propeller and coils are arranged in a duct.

Forced convection heat exchangers subsea are known from several publications. This present invention addresses aspects of a support system, and provides a pump module to create forced convection. While retrievable pump systems are well known in the industry, this present invention relates to a system with superior features as outlined below.

Common passive subsea coolers according to the known art offer little or no control over the cooling process. Other non-cooling related, subsea pump systems are controlled by separate power and control modules arranged either subsea or topside.

BRIEF SUMMARY OF THE INVENTION

The pump module according to the present invention integrates power and control canisters within the pump module, giving a simple and compact arrangement. The solution is made possible using an interface/support structure.

The purpose of the support structure is to:
a. Provide a tight structural link between motor and pump
b. Support two power and control canisters
c. Provide structural support of the pump module onto mini-guide posts arranged next to an outlet flange on the heat exchanger.

The support module of the invention is designed to interface with a running tool; typically of a kind for replacement of large bore valve actuators The cooler of the present invention cooler is designed to solve the subsea cooling requirements in particular in connection with subsea gas compression. Furthermore the present invention provides a solution for providing more predictable cooling efficiency, better control of the output temperatures, easy maintenance and retrieval of essential components, predictable performance, better control of scale formation, easier removal of scale, growth and impurities, etc. The performance of a shell and tube heat exchanger used in connection with the present invention is well proven, predictable and reliable. Their design is fully established, with only minor uncertainties related to their design and operation. Accordingly, a shell and tube heat exchanger is a cost effective "off the shelf" product that can be bought for onshore/topside applications and that can be converted for use in connection with the present application.

The present invention is based on a topside based "shell and tube cooler" or "shell and tube heat exchanger" that uses seawater as a cooling medium, adapted to subsea use. There are several advantages in using an already known design for the purpose of the present invention. Some of the key benefits include utilizing a design that is fully established, with only minor uncertainties related to performance and operation. Forced cooling provides a more compact design for the same performance compared to a passive cooler. Accordingly, the cooler can be made smaller and lighter. Due to the high water flow speed over the tubes carrying the produced fluid, surface temperature will be kept low, thus avoiding any scale formation. For the same reason no silt will settle on the tubes. Additionally, the cooling temperature can be controlled by regulating pump capacity/flow rate, and cleaning can conveniently be performed using chemicals in the closed room between the shell and the tubes.

The present invention relates to a heat exchanger as described above for subsea use.

The present invention concerns a cooling apparatus for subsea applications with a shell and tube heat exchanger. The heat exchanger includes a longitudinal shell with a first side and a second side opposite said first side. The shell forms a shell cavity with a shell side fluid inlet port and a shell side fluid outlet port, and at least one end part. The shell and tube heat exchanger furthermore includes a bundle of tubes extending from into the shell on said first side of said shell. The inlet plenum chamber includes an inlet port. A bundle of tubes also extends from an outlet plenum chamber, and into said shell on said first side of said shell. The outlet plenum chamber includes an outlet port. At least one tube sheet seals against the shell cavity, said inlet plenum chamber and said outlet plenum chamber. The bundle of tubes extending from the inlet plenum chamber is in fluid connection with the bundle of tubes extending from the outlet plenum chamber for allowing fluid to flow from said inlet plenum chamber and to the outlet plenum chamber. The cooling apparatus further includes a retrievable pump module with sealed pump module housing, adjacent the heat exchanger. The pump module housing includes a motor and an ambient sea water pump driven by the motor for providing circulation of ambient sea water through the heat exchanger. A pump module receptacle housing is provided to releasable and retrievably connect the pump module to the heat exchanger and an inlet for ambient sea water.

The heat exchanger may be horizontal, vertical or inclined.

A shell and tube heat exchanger according to the invention includes a shell with a longitudinal center section, a first end part and a second end part. The shell and the end parts form a cavity. The shell is typically cylindrical, and the end parts are typically flat, hemispherical, or elliptical.

At least one tube sheet sealing against the shell of the center section of the longitudinal shell divides the cavity into an inlet chamber with an inlet port for fluid, a center chamber with an inlet port and an outlet port for a liquid, and an outlet chamber with an outlet port for cooled fluid. If the shell is cylindrical, then the at least one tube sheet should be round to provide a proper partition between the various chambers and cavities. It is clearly possible to contemplate using more than two tube sheets if for instance several cavities for cooling liquid is desired. A bundle of tubes extends from the at least one tube sheet, through said longitudinal center section, for providing fluid communication between the inlet chamber and the outlet chamber, and heat exchange between the cooling liquid and the fluid to be cooled. The tubes are in contact with holes in the tube sheets and are attached to the tube sheets by well known methods, such as welding etc.

Due to an expected lower reliability and shorter replacement time than the heat exchanger, the pump module is designed to be separately replaceable. Accordingly, a retrievable pump module with sealed pump module housing is placed adjacent the heat exchanger. Adjacent in this context is also intended to cover integrated into one of the chambers of the heat exchanger or into an elongation of the outer shell. The pump module includes a motor and a pump driven by the motor for providing cooling liquid circulation.

The pump module is compact and designed to be easily replaceable.

The pump module may draw power from an external source using conventional electrical power leads/jumpers and subsea electrical connectors.

The motor will normally be an oil (or liquid) filled subsea electrical induction ("squirrel cage") motor. The motor may be connected to the pump or impeller by use of a magnetic coupling. Such a magnetic coupling allows the electrical motor to be in a hermetically sealed environment, without any leak paths to seawater. To allow for thermal expansion, it is linked to an accumulator also arranged within the pump module. A mechanical seal isolating the motor from the environment can be used as an alternative, but such seals may leak leading to reduced operational life of the motor.

A pump module receptacle housing is in fluid communication with the center chamber for releasable and retrievably connecting the pump module to the heat exchanger. The location of the pump module receptacle housing dictates the location of the pump module. This design provides a reliable and easily replaceable pump module. In this way, the pump module is designed to be reliable and easily replaced.

A support frame or skid supports the heat exchanger and the pump module receptacle housing. The purpose of this frame is to protect the apparatus during transportation and installation and to provide guiding as it undocks from, or lands on a foundation. Furthermore, shock absorbers might be incorporated in order to minimize and control landing shock loads.

The apparatus may be placed upstream or downstream of for instance a compressor station.

The apparatus may be integrated with a pipeline manifold structure that directs the flow and links a pipeline network to a compressor station. The apparatus may also be integrated with a compressor station.

The support frame or skid with all the components of the apparatus forms a retrievable module. It will normally be arranged to allow the produced fluid to by-pass the heat exchanger. The heat exchanger will thus be arranged in a subsea module such that the support frame or skid matches a foundation on a receiving structure. The shell and tube heat exchanger is normally arranged horizontally, but may also be arranged vertically (or at any angle in between).

The pump module receptacle housing may communicate with the outlet port for the cooling liquid, and a sea water inlet strainer is provided for limiting particle size sucked into the inlet port when sea water is used as cooling liquid. The apparatus may also form a part of a multi circuit cooling system where other liquids than seawater is used in the apparatus of the invention The pump module is adapted to be separately, diverless retrievably installed into the pump module receptacle housing.

The pump module may be connected to the pump module receptacle housing with a ROV operated locking mechanism.

The pump module receptacle housing may as mentioned previously, be integrated in the heat exchanger.

A controller for controlling the pump module may be integrated in the module. The controller may include a variable speed drive (frequency converter), and sensors. The electrical motor may be driven by redundant (dual) frequency converters (variable speed drives) for motor control. These may be integrated into the pump module. Such control may be necessary for a safe start-up of the electrical motor and to control the pump. The water flow can thus be set to achieve a pre-determined temperature of the cooled process flow. Process gas temperature sensors can be arranged within the heat exchanger module or externally, e.g. at the compressor inlet.

The cooling apparatus may further include diverless well fluid connectors, normally vertical to ease retrieval.

The cooling apparatus may further including a ROV "hot stab" type port for injection of e.g. cleaning chemicals into the cavity between the shell and the tubes.

The inlet strainer may be arranged below the heat exchanger to minimize the amount of debris entering the strainer.

External corrosion protection of the apparatus may be vital, and in addition to painting the external surfaces, sacrificial anodes may be required.

The pump module will as mentioned normally be mounted on the discharge side of the heat exchanger, with a receptacle that the pump module can be put into. The advantage with a discharge side arrangement is that suction can be used to aid sealing between pump module and heat exchanger. The disadvantage is that is operational temperature will be higher than the surrounding seawater temperature, making cooling of pump module electronics and motor more comprehensive. Alternatively the pump module may be arranged on the inlet side. The pump module could then integrate the inlet strainer and comprise a sealing and locking mechanism that can handle the full pressure difference of the pump/impeller.

The design may allow retrieval of the apparatus to the surface for repair and maintenance. This will require diverless process pipe connectors for cooler inlet and outlet. Normally vertical connectors are used, allowing the cooler to be pulled up vertically.

The heat exchanger may be thermally insulated to improve flow assurance aspects.

One advantage of the "shell and tube" cooler is that its outer shell, in a shut-down situation and with the pump turned off, will benefit from the entrapped water to provide an extended cool-down time. Extended cool-down time is of benefit as it increases the time for a process fluid to reach a hydrate formation temperature. Also during a start-up from a cold condition, by deferring pump motor start-up, the initial cold produced fluid in the cooler will be more quickly warmed up. The produced fluid will thus reach the temperature beyond which hydrates will not form, earlier. This effect is beneficial to avoid hydrate formation and can be further enhanced by applying thermal insulation to the cooler shell.

The internal volume between the cooler shell and the tubes can also be filled with a suitable chemical for cleaning purposes. Such chemicals can be filled by use of an ROV or a suitable line in an umbilical.

The fluid connection between the bundle of tubes extending from the inlet plenum chamber and the bundle of tubes extending from the outlet plenum chamber may be provided by a third plenum chamber limited by a tube sheet sealing against the shell cavity and said third plenum chamber at the second side of the longitudinal shell.

The fluid connection between the bundle of tubes extending from the inlet plenum chamber and the bundle of tubes extending from the outlet plenum chamber may be provided by U-shaped tubes in said bundle of tubes.

Adjacent in the context of the location of the pump in relation to the heat exchanger is intended to cover both built into the heat exchanger, secured to a common frame securing both the heat exchanger and the pump module receptacle housing.

Furthermore, the present invention defines a separately retrievable submersible pump module for a submerged heat exchanger. The pump module comprises an electric motor, a pump for connection with the electric motor, at least one canister containing components for controlling the electric motor, and thereby the flow rate from the pump through the heat exchanger and thus the cooling effect offered by the heat exchanger. Furthermore the pump module includes at least one releasable coupling for releasable attachment of the submersible pump module with the heat exchanger, and for allowing forced flow of ambient cooling sea water through the pump and the heat exchanger.

The motor in the module may be a liquid filled subsea electrical induction motor.

The separately retrievable submersible pump module may furthermore include a magnetic coupling, connecting the motor to the pump, thus allowing the motor to be completely sealed without any movable components extending through a housing on the motor.

The separately retrievable submersible pump module may further include an interfacing structural element providing a transition between the motor and the at least one canister (64).

The separately retrievable submersible pump module may further include at least two canisters containing components for controlling the electric motor and for providing a redundant control system.

The separately retrievable submersible pump module may further include an electrical, oil filled junction box in fluid connection with the motor accommodating electric interconnecting cabling with and splitter boxes.

BRIEF DESCRIPTION OF THE DRAWINGS

Short description of the enclosed figures:

FIG. 1b is a top view of the of a cooling apparatus shown in FIG. 1a;

FIG. 3a is a side elevation of a pump module according to the invention;

FIG. 3b is a cross section A-A of the pump module shown in FIG. 3a;

FIG. 3c is a cross section B-B of the pump module shown in FIG. 3b;

FIG. 4a is a cross section of a motor module receptacle housing and a pump module installed in the motor module receptacle housing;

FIG. 4b is a side elevation of the motor module receptacle housing shown in FIG. 4a;

DETAILED DESCRIPTION OF THE INVENTION

Figure 1A:
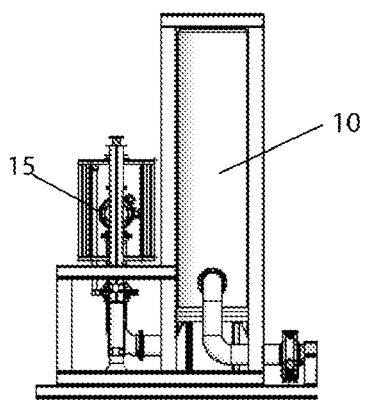
FIG. 1a is a side elevation of a cooling apparatus according to the invention.
Figure 1B:
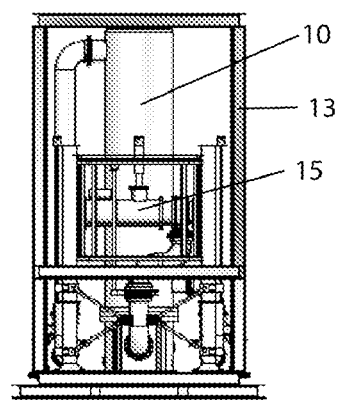
Figure 1C:
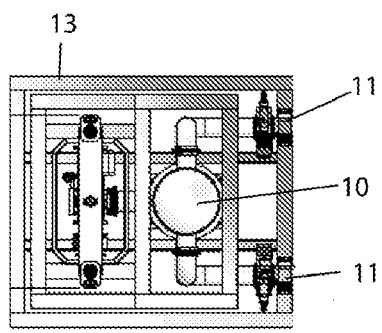
FIG. 1c is a cross section B-B of a pump module and pump module receptacle as shown in FIG. 1b.

FIGS. 1a-1c show a general arrangement of an embodiment of a subsea cooler according to the invention. A vertical shell and tube heat exchanger 10 is attached to two diverless process pipe connectors 11. A support frame 13 houses the heat exchanger 10 and a pump module 15. The frame 13 is provided for protection, ease of transportation, installation and recovery/retrieval. A pump module 15 is installed in a housing 14. Furthermore, the pump module 15 may include a ROV operated locking mechanism. External power and signals may be linked to the pump module using diverless connector(s). The pump module may be secured to the cooling apparatus with a ROV operated locking mechanism only. The pump is shown connected to the outlet, at the opposite side of the inlet but it could have been placed at inlet side of the heat exchanger. The inlet may include an inlet strainer, the inlet strainer should be connected to inlet to reduce pump wear, abrasion, contamination etc.

An arrangement and running tool for pump module replacement that may be required is not shown. No external piping and connectors for coolant/cooling liquid (sea water) may be necessary as the ambient water is used for cooling.

The cooler is based on forced convection as they use a pump to circulate the seawater.

Figure 2:
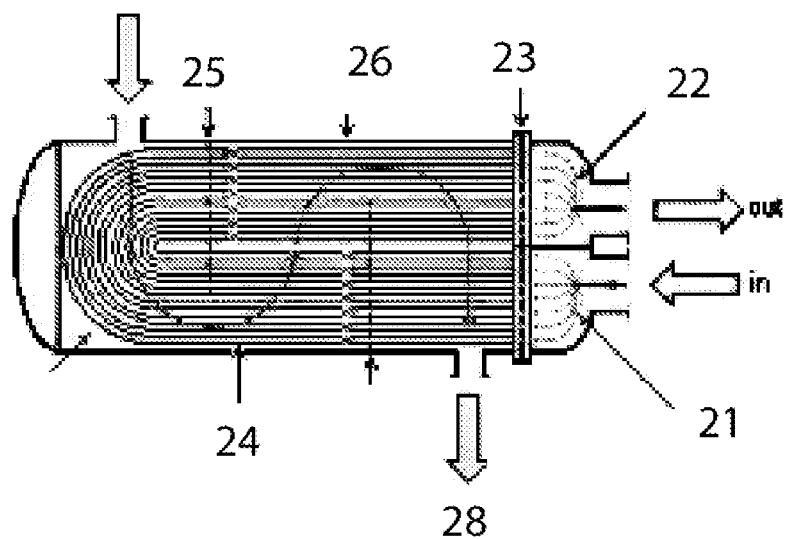
FIG. 2 is a cross section of a shell and tube heat exchanger used in connection with the invention.

FIG. 2 shows a shell and tube heat exchanger which consists of a shell 26 (a large tube-shaped pressure vessel), with a bundle of tubes 24 inside it (not shown). The tubes run from an inlet chamber 21 to an outlet chamber 22. These chambers are formed by the shell 26 and at least one internal tube sheet 23. Both hot produced fluid to be cooled and the cold seawater, flow through the heat exchanger. The hot produced fluid flows through the tubes (the inside) and the seawater flows on the outside of the tubes but inside the shell (the shell side). The direction of the heat transfer may however be turned and the seawater may then flow through the tubes (the inside) and the hot produced fluid may flow on the outside of the tubes but inside the shell (the shell side). Heat is transferred from the produced fluid to the seawater through the tube walls. A large heat transfer area is preferred to transfer heat efficiently, normally leading to a high number of tubes. Diverless process piping connection hubs (not shown) for the produced fluid may be connected to the inlet chamber 21 and the outlet chamber 22. An inlet strainer may be, arranged below the shell to minimise the effect of e.g. silt that is settling down. The strainer may be coarse, to avoid clogging. An outlet 28 may be provided with a flange for connecting the pump module housing 14 in FIG. 1. The heat exchanger may include internal baffles 25 to direct the seawater across the tubes thus increasing the heat transfer.

FIG. 3, shows a pump module with a housing 31, typically made in a metallic material or glass fibre material. The purpose of the housing 31 is to offer mechanical protection and to conduct discharged water from the pump 35 past electronic containers 32 thus providing cooling. Electrical connector(s) and interface to a recovery and installation arrangement are not shown. A subsea electrical induction motor 33 is housed in a hermetically sealed housing 38. Torque from the motor 33 to the pump 35 is transmitted via a magnetic coupling 34. Two electronic containers 32 are included, one redundant to the other. The containers 32 houses variable speed drives (frequency converters) and control electronics in e.g. nitrogen and at one atmosphere. A third container 37 includes a liquid compensator for the electric motor. Not shown are the diverless electrical connectors, its cabling to the electronic containers 32 and distribution between the connector(s), containers and motor. A lower flange 36 on the pump module, lands on a corresponding flat face 42 of a receptacle housing 41 shown in FIG. 4b.

FIG. 4 shows the pump module receptacle housing 41, which is connected to the shell and tube heat exchanger by piping. The piping 18 is shown in FIG. 1. The housing 41 integrates a typical ROV operated locking mechanism that is shown in greater detail in FIG. 5. A soft gasket, not shown, between these surfaces 36, 42 can be used to provide additional sealing, if required.

Figure 5:
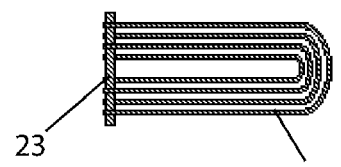
FIG. 5 is a schematic representation of a U-shaped tube of tubes used in connection with the invention.

FIG. 5 is a schematic representation of a U-shaped bundle of tubes 52 used in connection with the invention. One side of the tubes in the bundle 52 is intended to extend from the an inlet plenum chamber (reference 21 in FIG. 2) with an inlet port and into said shell on said first side of the shell, and the other side of the tubes in the bundle 52 extends from an outlet plenum chamber (reference 22 in FIG. 2).

Figure 6:
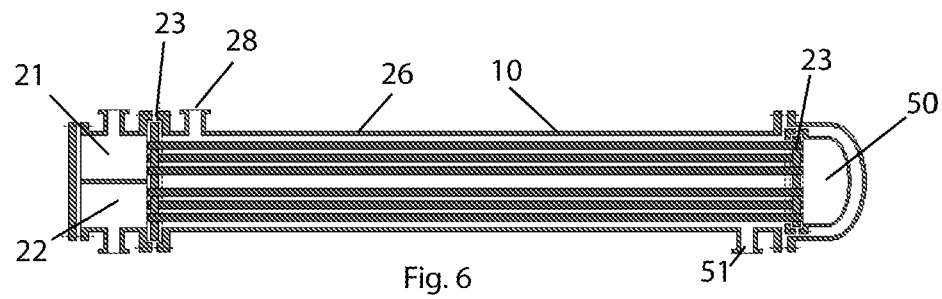
FIG. 6 is a schematic representation of a heat exchanger that can be used in connection with the invention.

FIG. 6 is a schematic representation of an alternative heat exchanger 10 where discrete bundles of tubes extend from the inlet plenum chamber 21 and the outlet plenum chamber 22 respectively. A third plenum chamber 50 connects the discrete tube bundles for allowing fluid to flow from the inlet plenum chamber 21 to the outlet plenum chamber 22. The third plenum chamber is sealed from the shell 26 with a second tube sheet 23. The third plenum chamber 50 may be confined by a bonnet. The shell 26 includes a shell inlet 28 and a shell outlet 51 at opposite ends of the shell 26.

Figure 7:
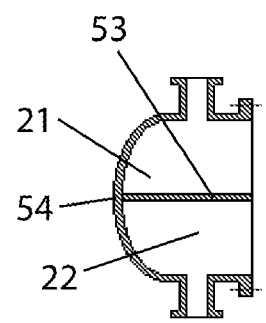
FIG. 7 shows a cross section of a bonnet or integral cover forming plenum chambers.

FIG. 7 shows a cross section of a bonnet 54 or integral cover forming an inlet plenum chamber 21 and an outlet plenum chamber 22. An internal sealing plate 53 divides the bonnet into the inlet and outlet plenum chambers.

Figure 8A:
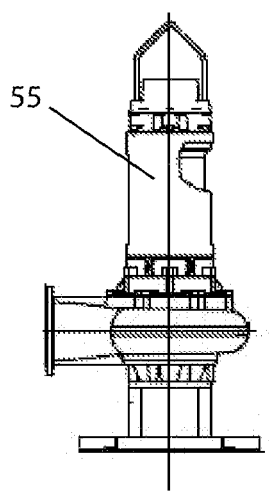
FIGS. 8a, 8b show a centrifugal pump and motor assembly that may be used in connection with the invention.
Figure 8B:
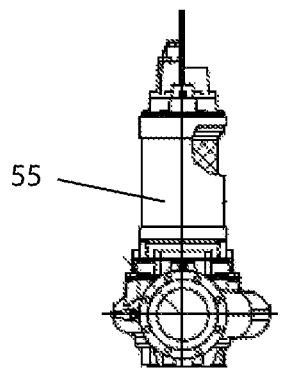

The FIGS. 8a, 8b show two views of a centrifugal pump and motor assembly 55 that may be used in connection with the invention.

Figure 9:
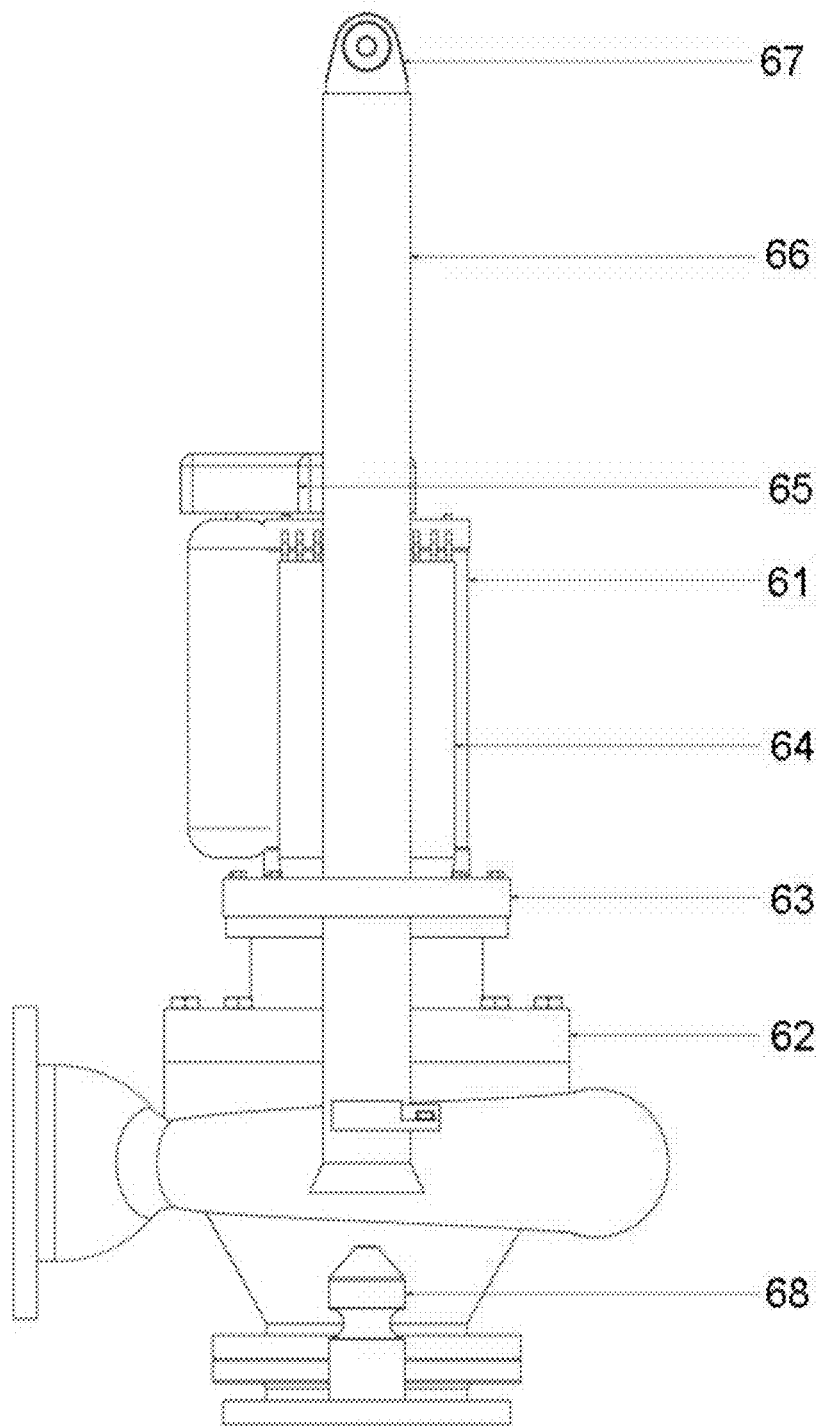
FIG. 9 is a side elevation of a retrievable pump module for a submerged shell and tube heat exchanger according to the invention.
Figure 10:
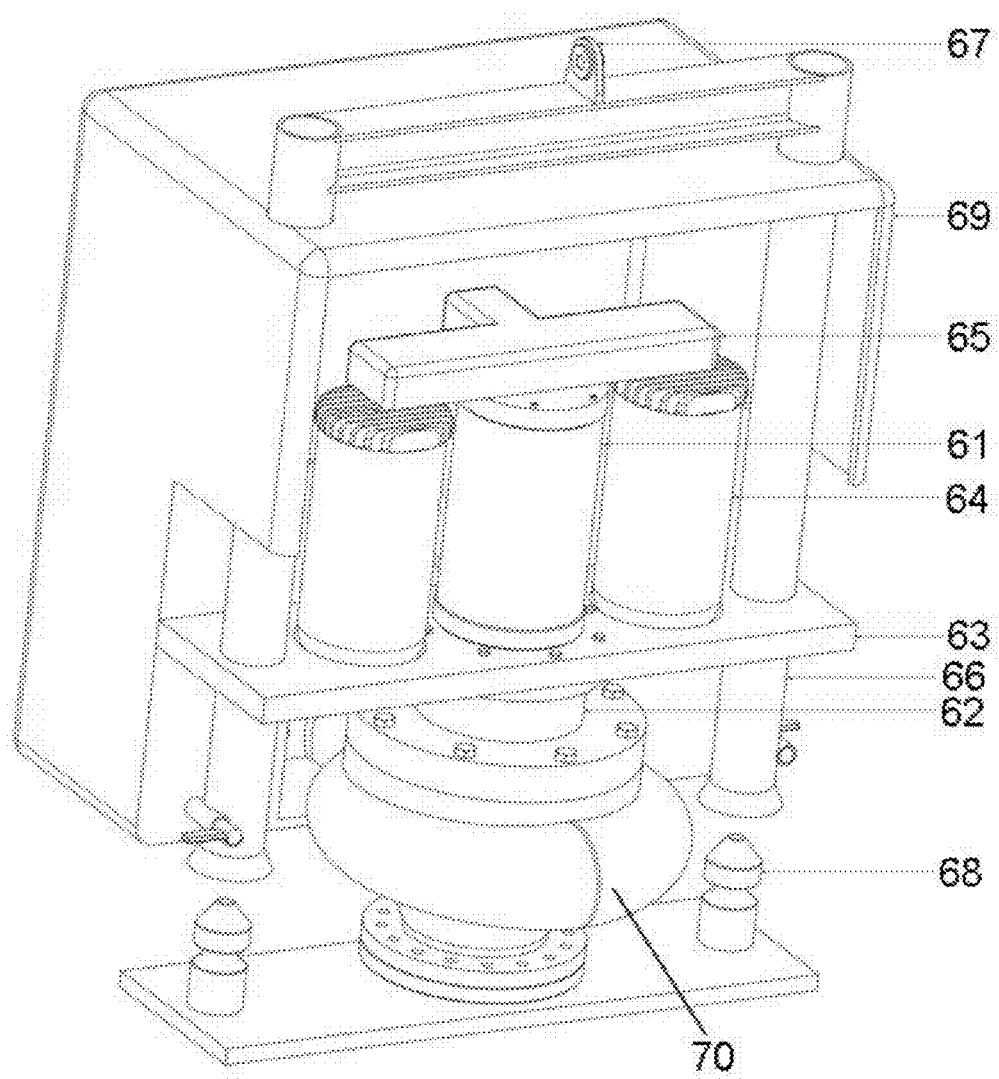
FIG. 10 is a perspective view of the retrievable pump module shown in FIG. 9.
Figure 11:
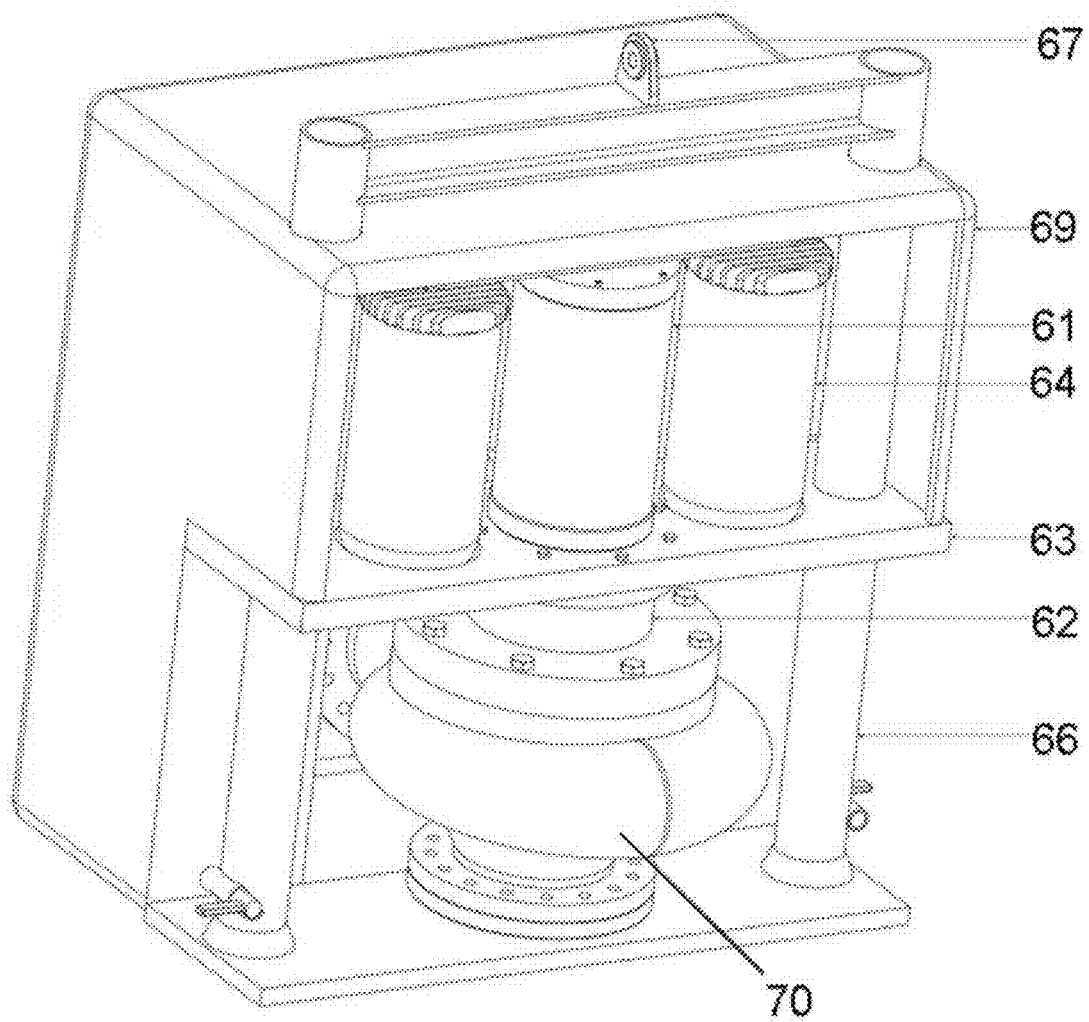
FIG. 11 corresponds to the FIGS. 9, and 10, and shows the module connected to a portion attached to a heat exchanger.

The FIGS. 9, 10 and 11 show a retrievable pump module for a submerged shell and tube heat exchanger according to the invention. Similar reference numerals refer to similar components, and the following description is relevant to all the FIGS. 9-11 unless something else is stated.

FIG. 9 is a side elevation of the retrievable pump module according to the invention. An electric, oil filled motor 61 is connected to a pump 70 through a magnetic coupling 62. Oil filled motors are well known in the industry and special cooling loops are typically used to ensure sufficient cooling. The present invention proposes using a seawater channel in heat transferring connection with the motor and allowing seawater from the exit of the heat exchanger to flow through these channels to cool the motor 61. The seawater conduit 69 in FIG. 10 is an example of such a seawater channel. The conduit encloses all the critical components of the pump module and ensures that required operating temperatures for the components inside the conduit are maintained within a suitable operating temperature range. In other words, the seawater conduit 69 is arranged to direct seawater from a pump outlet to motor and electronic canisters in order to enhance cooling.

The magnetic coupling 62 between motor 61 and pump 70 allows the motor to be hermetically sealed with no leak paths. The motor oil system may include an expansion tank for accommodating variations in volume. Typically, the volume varies due to thermal expansion of the material of the motor and of the oil. When a system of the above mentioned type is used, it is not necessary to use complex seal arrangements or overpressure systems.

An interfacing structural element 63 provides a transition between the motor 61 and provides a connection to two power and signal electronic canisters 64. The two power and signal electronic canisters 64 provide a, fully redundant, power and control system in case of failure of one of the signal electronic canisters 64, thus providing enhanced reliability. Typically frequency converters are used for speed control. This control system also integrates temperature sensors for heat exchanger control as well as sensors verifying proper operation of the pump module. As for the motor cooling, the canisters 64 are cooled by directing the exiting seawater over them.

An electrical junction box 65 is oil filled and at ambient pressure. The electrical junction box 65 is in fluid connection with the motor 61 and shears thus the expansion tank with motor 61. The electrical junction box 65 accommodates all electric interconnecting cabling with their splitter boxes. The electrical junction box 65 is arranged as a junction bridge above the motor 61 and the canisters 64.

The pump module is typically connected with a ROV wet mate electrical connector (not shown), but with the connection at the junction box end.

Support legs 66 fits into corresponding mini-guide posts 68 arranged on the heat exchanger/cooler.

A lifting point 67 is attached at the top of the module to allow the module to be lowered or retrieved to the surface, using a suitable winch on a vessel.

The mini guidepost 68 arranged on the cooler/heat exchanger and mates with the support legs 66 on the pump module.

FIG. 10 also shows a seawater conduit 69 as a part of the pump module for protecting the pump module from mechanical impacts from falling objects etc. The seawater module 69 can also contribute in ensuring a controlled environment for the components inside the pump module, by allowing seawater from the exit from the heat exchanger to flow past the components of the pump module inside the seawater conduit 69.

The description above proposes locating the pump module at an outlet side of the heat exchanger. The pump module may however be located on the heat exchanger inlet side (instead of outlet side as shown). The FIGS. 9-11 show a centrifugal pump. An axial pump may however be used instead. Furthermore, the number of control canisters with the pump control components may be higher than two. Only one control canister may also be used, but it is an advantage with a redundancy in the system as explained above.

A ROV operated clamp may be used to lock a pump suction flange to a seawater outlet flange on the heat exchanger (not shown).

The invention claimed is:

1. A cooling apparatus for subsea applications, including:
   a support frame;
   a shell and tube heat exchanger, wherein the shell and tube heat exchanger comprises:
      a longitudinal shell with a first side and a second side opposite said first side, said longitudinal shell forming a shell cavity with a shell side fluid inlet port and a shell side fluid outlet port, and at least one end part;
      a bundle of tubes extending from an inlet plenum chamber with an inlet port, and into said longitudinal shell on said first side of said longitudinal shell;
      a bundle of tubes extending from an outlet plenum chamber with an outlet port, and into said longitudinal shell on said first side of said longitudinal shell; and
      at least one tube sheet sealing against the shell cavity, said inlet plenum chamber and said outlet plenum chamber, wherein
      said bundle of tubes extending from the inlet plenum chamber are in fluid connection with said bundle of tubes extending from the outlet plenum chamber for allowing fluid to flow from said inlet plenum chamber to said outlet plenum chamber;
   a retrievable pump module coupled to said shell and tube heat exchanger, wherein the retrievable pump module comprises:
      a sealed pump module housing;
      a liquid-filled subsea electrical induction motor; and
      an ambient sea water pump driven by said liquid-filled subsea electrical induction motor through a magnetic coupling allowing the liquid-filled subsea electrical induction motor to be in a hermetically sealed environment, without any leak paths to seawater, for providing circulation of ambient sea water through the shell and tube heat exchanger;
   a pump module receptacle housing configured to (i) releasably and retrievably connect the retrievable pump module to the shell and tube heat exchanger and an inlet for ambient sea water, and (ii) receive the retrievable pump module therein;
   a controller for controlling the retrievable pump module, the controller including a variable speed drive; and
   temperature sensors,
   wherein
   the controller and the temperature sensors are integrated in the retrievable pump module, and
   the support frame encloses the shell and tube heat exchanger, the retrievable pump module, and the pump module receptacle housing.

2. The cooling apparatus of claim 1, wherein the pump module receptacle housing communicates with the outlet port for providing cooling liquid, and a seawater inlet strainer is provided for limiting particle size sucked into the inlet port, such that seawater is used as the cooling liquid.

3. The cooling apparatus of claim 2, wherein the seawater inlet strainer is arranged below the shell and tube heat exchanger to minimize an amount of debris entering the seawater inlet strainer.

4. The cooling apparatus of claim 2, wherein the controller is contained in a canister, and the canister is cooled by the cooling liquid.

5. The cooling apparatus of claim 4, wherein the shell and tube heat exchanger further comprises at least one guidepost, the retrievable pump module further comprises at least one support leg, and the at least one support leg mates with the at least one guidepost to couple the shell and tube heat exchanger with the retrievable pump module.

6. The cooling apparatus of claim 1, wherein the retrievable pump module is adapted to be separately, diverlessly retrievably installed into the pump module receptacle housing.

7. The cooling apparatus of claim 1, wherein the retrievable pump module is connected to the pump module receptacle housing with an ROV operated locking mechanism.

8. The cooling apparatus of claim 1, wherein the pump module receptacle housing is integrated in the shell and tube heat exchanger.

9. The cooling apparatus of claim 1, further including diverless, vertical well fluid connectors to ease retrieval.

10. The cooling apparatus of claim 1, further including an ROV hot stab type port for injection of cleaning chemicals into a cavity between the longitudinal shell, the bundle of tubes extending from the inlet plenum chamber, and the bundle of tubes extending from the outlet plenum chamber.

11. The cooling apparatus of claim 1, wherein the shell and tube heat exchanger is thermally insulated to improve flow assurance.

12. The cooling apparatus of claim 1, wherein the support frame includes at least a top portion and two side portions, and supports the shell and tube heat exchanger and the pump module receptacle housing.

13. The cooling apparatus of claim 1, wherein the at least one tube sheet comprises a first tube sheet and a second tube sheet, the first tube sheet sealing against the shell cavity, said inlet plenum chamber and said outlet plenum chamber, said fluid connection between said bundle of tubes extending from the inlet plenum chamber and said bundle of tubes extending from the outlet plenum chamber is provided by a third plenum chamber limited by the second tube sheet sealing against the shell cavity and said third plenum chamber at the second side of the longitudinal shell.

14. The cooling apparatus of claim 1, wherein said fluid connection between said bundle of tubes extending from the inlet plenum chamber and said bundle of tubes extending from the outlet plenum chamber is provided by U-shaped tubes comprising each said bundle of tubes extending from the inlet plenum chamber and said bundle of tubes extending from the outlet plenum chamber.

\* \* \* \* \*